(12) United States Patent
Chung et al.

(10) Patent No.: US 8,860,268 B2
(45) Date of Patent: Oct. 14, 2014

(54) ROTATIONAL VIBRATION EXCITER

(75) Inventors: Wan Sup Chung, Daejeon (KR); Sae Won Yoon, Daejeon (KR); Jong Yeon Lim, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 409 days.

(21) Appl. No.: 13/393,464

(22) PCT Filed: Jul. 28, 2010

(86) PCT No.: PCT/KR2010/004956
§ 371 (c)(1),
(2), (4) Date: May 15, 2012

(87) PCT Pub. No.: WO2011/025151
PCT Pub. Date: Mar. 3, 2011

(65) Prior Publication Data
US 2012/0217835 A1    Aug. 30, 2012

(30) Foreign Application Priority Data

Aug. 31, 2009 (KR) .................. 10-2009-0081032

(51) Int. Cl.
*H02K 7/06* (2006.01)
*H02K 11/00* (2006.01)
*H02K 3/26* (2006.01)
*H02K 21/24* (2006.01)

(52) U.S. Cl.
CPC *H02K 7/06* (2013.01); *H02K 21/24* (2013.01); *H02K 3/26* (2013.01)

USPC .............. 310/81; 310/68 B; 310/71; 310/112; 310/195

(58) Field of Classification Search
CPC .............................. H02K 7/065; H02K 35/04
USPC ............ 310/81, 15, 36, 112, 268, 68 R, 68 B, 310/195, 71
IPC ....................................................... H02K 35/04
See application file for complete search history.

(56) References Cited

U.S. PATENT DOCUMENTS

| | | | |
|---|---|---|---|
| 6,305,675 B1 | 10/2001 | Muramatsu | |
| 7,291,956 B2 * | 11/2007 | Itoh et al. | 310/208 |
| 2004/0222708 A1 * | 11/2004 | Hobson et al. | 310/36 |
| 2006/0255670 A1 * | 11/2006 | Ki et al. | 310/81 |
| 2008/0219085 A1 | 9/2008 | Heichel et al. | |
| 2009/0309436 A1 * | 12/2009 | Saito et al. | 310/81 |

FOREIGN PATENT DOCUMENTS

| | | |
|---|---|---|
| JP | 5138126 A | 6/1993 |
| JP | 200165631 A | 3/2001 |
| JP | 11216423 A | 8/2011 |
| KR | 100780915 B1 | 11/2007 |

* cited by examiner

*Primary Examiner* — Tran Nguyen
*Assistant Examiner* — Thomas Truong
(74) *Attorney, Agent, or Firm* — The Webb Law Firm

(57) ABSTRACT

Provided is an rotational vibration exciter, and more particularly to an rotational vibration exciter which can accurately generate angular vibration of a printed circuit board including a moving coil for rotational excitation and angular vibration of a rotational shaft integrated with the printed circuit board including the moving coil by replacing a conventional cable as an external current supply line with a vertical flexible PCB.

8 Claims, 12 Drawing Sheets

ROTATIONAL VIBRATION EXCITER

TECHNICAL FIELD

The present invention relates to an rotational vibration exciter, and more particularly, to an rotational exciter capable of accurately generating angular vibration of a printed circuit board (PCB) on which a moving coil for angular vibration is formed and angular vibration of a rotational shaft rigidly fixed to the PCB on which the moving coil is formed so as to integrally rotate with the PCB, by replacing an external current supply wire with a vertical flexible PCB in a conventional cable.

BACKGROUND ART

Angular vibration means sinusoidal sinusoidal angular motion having a repeated amplitude and period. As a sensor for measuring angular vibration, angular accelerometers, angular rate sensors, angular encoder for directly measuring an angular displacement, or the like, have been used.

These angular vibration sensors need to define electrical sensitivity, which is defined by a ratio of an electrical output signal to unit angular vibration.

A process of measuring electrical sensitivity of sensors for angular vibration is referred to as correction of a vibration sensor. A need exists for a need an apparatus for generating angular vibration so as to correct the sensitivity of the angular vibration sensor. The apparatus generating the angular vibration is referred to as an rotational vibration exciter.

The rotational vibration exciter is divided into a rotational shaft, a mechanical device part supporting the rotational shaft, and an electromagnetic part generating Lorentz force. The electromagnetic part generating the Lorentz force is configured to a moving coil flowing external supplying current and a magnetic generating unit generating magnetic field in a direction orthogonal to the moving coil.

FIG. 1 is an electromagnetic configuration diagram for generating torque of a general rotational vibration exciter, which generates magnetic field in a direction orthogonal to the moving coil by a permanent magnet 100 mounted under a moving coil by supplying current i to the moving coil 20 mounted on the permanent magnet 10, thereby generating torque to the moving coil.

FIG. 2 is a diagram showing the moving coil manufactured according to the related art, which includes a rotational non-conducting plate 30, coils 40 applying current in a radial direction of the rotational non-conducting plate 30, wires each connecting the coils 40, and a current supply wire 60 applying current from the outside to the coils 40.

However, according to a method for manufacturing a moving coil according to the related art, a coil having the same size needs to be manually manufactured so as to manufacture a loop type coil. In this case, when the sizes and weights of the coils are not the same, unbalance of force occurs due to an unbalanced mass of the moving coil, which results in degrading performance of the rotational exciter.

In addition, even when the sizes and weights of the coils are manufactured to be same, the unbalanced mass may occur due to a fine position difference between the coils assembled in a radial direction.

Therefore, upon manufacturing the coils by a conventional manual labor and mounting the coils on a support plate, assembling them in the desired positions is very difficult, which results in degrading the performance and quality of the rotational vibration exciter.

Moreover, even in performing a soldering operation connecting the coils with one another and assembling the current supply wires for supplying external current to the coils, the unbalanced mass cannot be avoided.

Therefore, in order to solve the problems encountered in the related art, there is "a method for manufacturing a moving coil for an rotational vibration exciter using a method for manufacturing a multi-layer PCB (Registration No. KR10-0780915)" filed and registered as Patent by the present applicant.

The method of manufacturing a moving coil for an rotational vibration exciter using a method for manufacturing a multi-layer PCB (Registration No. KR10-0780915) is an improved method for manufacturing a moving coil for an rotational vibration exciter by using a method of manufacturing a PCB to prevent the performance and quality of the rotational vibration exciter from being degraded due to manufacturing and assembling errors through the manual labor.

Therefore, according to the method for manufacturing a moving coil for an rotational vibration exciter using a method for manufacturing a multi-layer PCB (Registration No. KR10-0780915), the method for manufacturing a multi-layer PCB enables precision manufacturing of the very uniform moving coils and controls the number of wound coils by controlling the number of PCB layers, thereby controlling the torque and the method for manufacturing a multi-layer PCB can provides precisely designed coil patterns to very uniformly maintain and manage electrical characteristic values like the resistance and inductance of the plurality of moving coils.

However, even in case of the rotational vibration exciter including the moving coil made by the "method for manufacturing a moving coil for an angular exciter using a method for manufacturing a multi-layer PCB (Registration No. KR10-0780915)", the moving coil was connected to a thick and massive cable sufficient to supply an external sinusoidal current.

However, the cable line has twist properties affecting the angular vibration of the PCB on which the moving coil for angular vibration is formed and transfers external vibration to the PCB on which the moving coil for angular vibration is formed through the cable line, such that it is difficult to accurately control the angular vibration of the PCB on which the moving coil for angular vibration is formed.

DISCLOSURE

Technical Problem

An object of the present invention is to provide an rotational vibration exciter capable of accurately controlling angular vibration of a PCB on which a moving coil for angular vibration is formed and angular vibration of a rotational shaft rigidly fixed to the PCB on which the moving coil for angular vibration is formed so as to integrally rotate with the PCB, by replacing an external current supply wire with a vertical flexible PCB in a conventional cable connected for supplying external current to the PCB on which the moving coil for angular vibration is formed.

Another object of the present invention is to provide an rotational vibration exciter including a PCB-typed moving coil for measuring induction voltage, thereby measuring angular vibration angular acceleration of a PCB on which a moving coil for angular vibration is formed and angular vibration angular acceleration of a rotational shaft rigidly fixed to the PCB on which the moving coil for angular vibration is formed so as to integrally rotate with the PCB.

Technical Solution

In one general aspect, there is provided an rotational vibration exciter, including: a body 100; a rotational shaft 200 having a top end exposed upwardly and mounted to rotate left and right in the body 100; an upper permanent magnet 131 and a lower permanent magnet 132 surrounding a bottom end of the rotational shaft 200 fixedly mounted in the body 100 while being vertically spaced from each other; a coil printed circuit board (PCB) 300 for angular vibration formed with a coil pattern 310 for angular vibration and disposed between the upper permanent magnet 131 and the lower permanent magnet 132 while being rigidly fixed to the rotational shaft 200 so as to integrally rotate with the rotational shaft 200; an upper PCB 400 mounted under the PCB-typed moving coil 300 for angular vibration so as to integrally rotate with the rotational shaft 200 and formed with a wire pattern 410 for upper PCB angular vibration electrically connected with the coil pattern 310 for angular vibration; a lower PCB 500 fixed to a bottom surface in the body 100 and formed with a wire pattern 510 for a lower PCB current supply source electrically connected with an external current supply source; and a vertical flexible PCB 700 having a top end electrically connected with the wire pattern 410 for upper PCB angular vibration and a bottom end electrically connected with the wire pattern 510 for the lower PCB current supply source.

The vertical flexible PCB 700 may have a meander shape including a left flexure and a right flexure. The PCB-typed moving coil 300 for angular vibration may be mounted with a PCB-typed moving coil fastening hole 320 for the angular vibration coil, the upper PCB 400 may be mounted with an upper PCB fastening hole 420 at a position corresponding to the PCB-typed moving coil fastening hole 320 for angular vibration, and the PCB-typed moving coil 300 for angular vibration and the upper PCB 400 may be fixedly fastened to the bottom end, of the rotational shaft 200 by a fastening bolt that is inserted through the PCB-typed moving coil fastening hole 320 for angular vibration coil and the upper PCB fastening hole 420.

The rotational vibration exciter may further include a PCB-typed moving coil 800 for measuring induction voltage formed with a coil pattern 840 for measuring induction voltage and disposed between the upper permanent magnet 131 and the lower permanent magnet 132 while being rigidly fixed to the rotational shaft 200 so as to integrally rotate with the rotational shaft 200. A bottom surface of the PCB-typed moving coil 800 for measuring induction voltage may be protrudedly mounted with a PCB-typed moving coil connection line 841 for measuring induction voltage electrically connected with the coil pattern 840 for measuring induction voltage, the PCB-typed moving coil 800 for measuring induction voltage may be mounted with a PCB-typed moving coil fastening hole 820 for measuring induction voltage, a bottom surface of the PCB-typed moving coil for angular vibration may be mounted with a PCB-typed moving coil connection line 311 for angular vibration electrically connected with the coil pattern 310 for angular vibration, the PCB-typed moving coil 300 for angular vibration may be mounted with the PCB-typed moving coil fastening hole 320 for angular vibration at a position corresponding to the PCB-typed moving coil fastening hole 820 for measuring induction voltage, the PCB-typed moving coil 300 for angular vibration may be mounted with a PCB-typed moving coil guide hole 331 for angular vibration protruded downwardly, having the PCB-typed moving coil connection line 841 for measuring induction voltage inserted thereinto, the upper PCB 400 may be further mounted with a wire 440 for measuring upper PCB induction voltage electrically connected with the coil pattern 841 for measuring induction voltage through electrical connection with the PCB-typed moving coil connection line 841 for measuring induction voltage, the upper PCB 400 may be mounted with the upper PCB fastening hole 420 at the PCB-typed moving coil fastening hole 320 for angular vibration, the PCB-typed moving coil 800 for measuring induction voltage, the PCB-typed moving coil 300 for angular vibration, and the upper PCB may be fixedly fixed to the bottom end of the rotational shaft 200 through a fastening bolt that is inserted through the PCB-typed moving coil fastening hole 820 for measuring induction voltage, the PCB-typed moving coil fastening hole 320 for angular vibration, and the upper PCB fastening hole 420, the lower PCB may be further mounted with a wire pattern 540 for measuring lower PCB induction voltage electrically connected with an external voltage measuring device, and the vertical flexible PCB 700 may be further mounted with a wire pattern 740 for measuring a vertical flexible PCB induction voltage of which the top end is electrically connected with the wire pattern 440 for measuring upper PCB induction voltage and the bottom end is electrically connected with the wire pattern 540 for measuring lower PCB induction voltage.

Advantageous Effects

The embodiments of the present invention can remove influence such as the torque and load of the conventional cable and external vibration transferred through the cable line, or the like, by replacing the conventional cable with the vertical flexible PCB as the external current supply wire connected for supplying external current to the PCB on which the moving coil for angular vibration is formed, thereby making it possible to accurately generate the angular vibration of the PCB on which the moving coil for angular vibration and the angular vibration of the rotational shaft rigidly fixed to the PCB on which the moving coil for angular vibration is formed so as to integrally rotate with the PCB.

Further, the embodiments of the present invention include the PCB-typed moving coil for measuring induction voltage so as to integrally rotate with the PCB on which the moving coil for angular vibration is formed, thereby making it possible to measure the rotational vibration angular velocity of the PCB on which the moving coil for angular vibration is formed and the angular vibration rate (angular velocity) of the rotational shaft rigidly fixed to the PCB on which the moving coil for angular vibration so as to integrally rotate with the PCB.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

100: BODY
131: UPPER PERMANENT MAGNET
132: LOWER PERMANENT MAGNET
200: ROTATIONAL SHAFT
300: PCB-TYPED MOVING COIL FOR ANGULAR VIBRATION
310: COIL PATTERN FOR ANGULAR VIBRATION
311: PCB-TYPED MOVING COIL CONNECTION HOLE FOR ANGULAR VIBRATION
320: PCB-TYPED MOVING COIL FASTENING HOLE FOR ANGULAR VIBRATION
400: UPPER PCB
410: WIRE PATTERN FOR ANGULAR VIBRATION
420: UPPER PCB FASTENING HOLE
440: WIRE PATTERN FOR MEASURING UPPER PCB INDUCTION VOLTAGE
500: LOWER PCB
510: WIRE PATTERN FOR A LOWER PCB CURRENT SUPPLY SOURCE
540: WIRE PATTERN FOR MEASURING LOWER PCB INDUCTION VOLTAGE
700: A VERTICAL FLEXIBLE PCB
710: WIRE PATTERN FOR A VERTICAL FLEXIBLE PCB ANGULAR VIBRATION
740: WIRE PATTERN FOR MEASURING A VERTICAL FLEXIBLE PCB INDUCTION VOLTAGE
800: PCB-TYPED MOVING COIL FOR MEASURING INDUCTION VOLTAGE
820: PCB-TYPED MOVING COIL FASTENING HOLE FOR MEASURING INDUCTION VOLTAGE
840: COIL PATTERN FOR MEASURING INDUCTION VOLTAGE
841: PCB-TYPED MOVING COIL CONNECTION HOLE FOR MEASURING INDUCTION VOLTAGE

[Best Mode]

Hereinafter, embodiments of the present invention will be described with reference to the accompanying drawings.

Embodiment 1

Embodiment 1, relates to an rotational vibration exciter according to the present invention.

Figure 1:
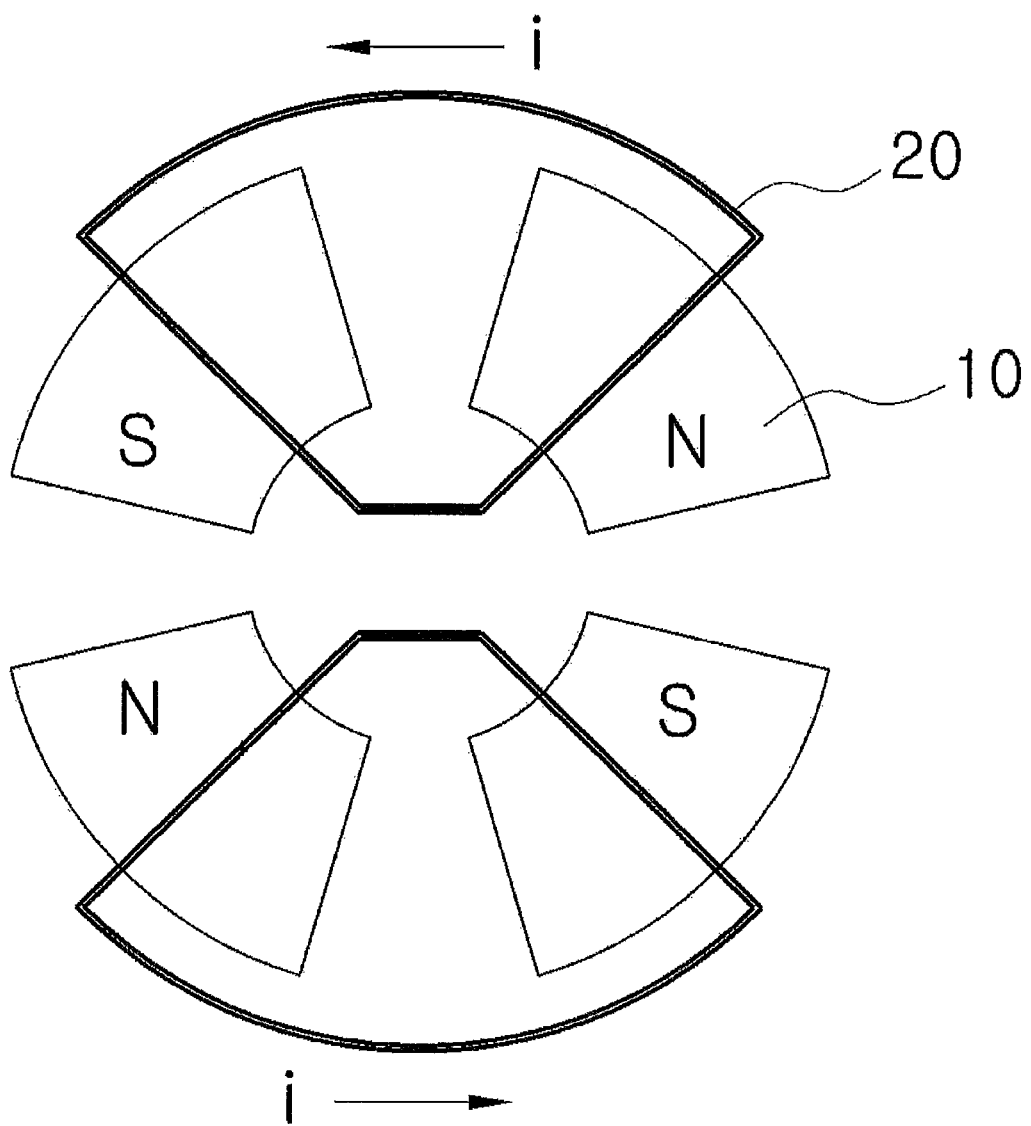
FIG. 1 is an electromagnetic configuration diagram for generating torque of a general rotational vibration exciter.
Figure 2:
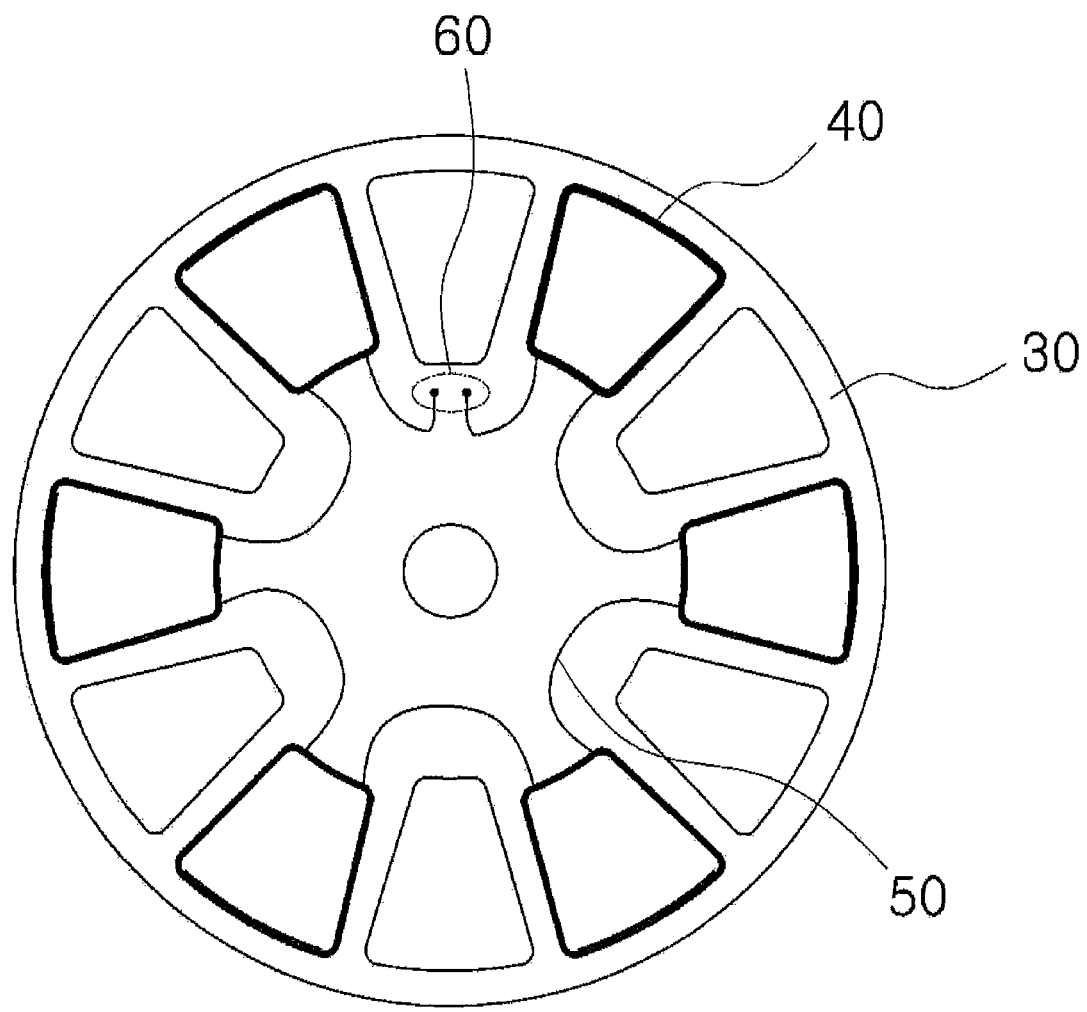
FIG. 2 is a diagram showing a moving coil manufactured according to the related art.
Figure 3:
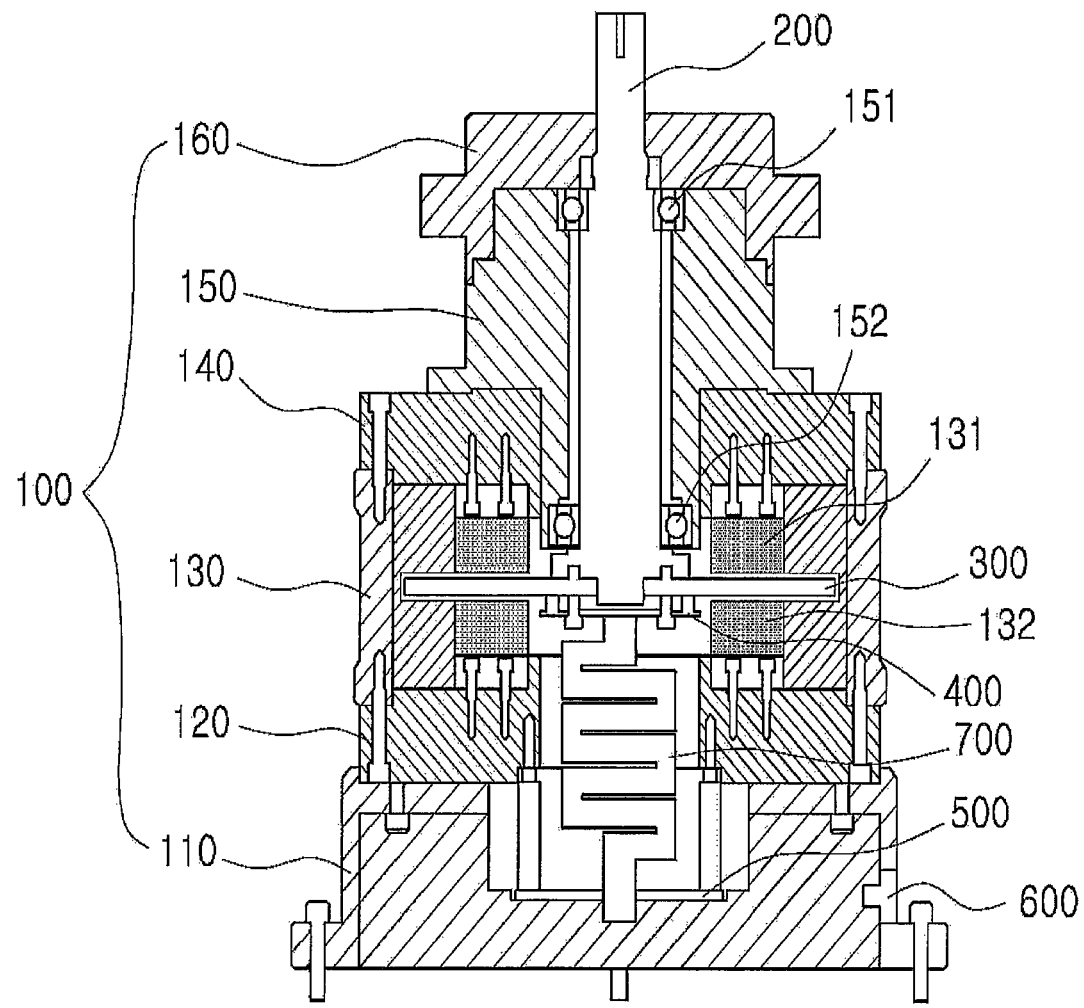
FIG. 3 is a longitudinal cross-sectional view of Embodiment 1.
Figure 4:
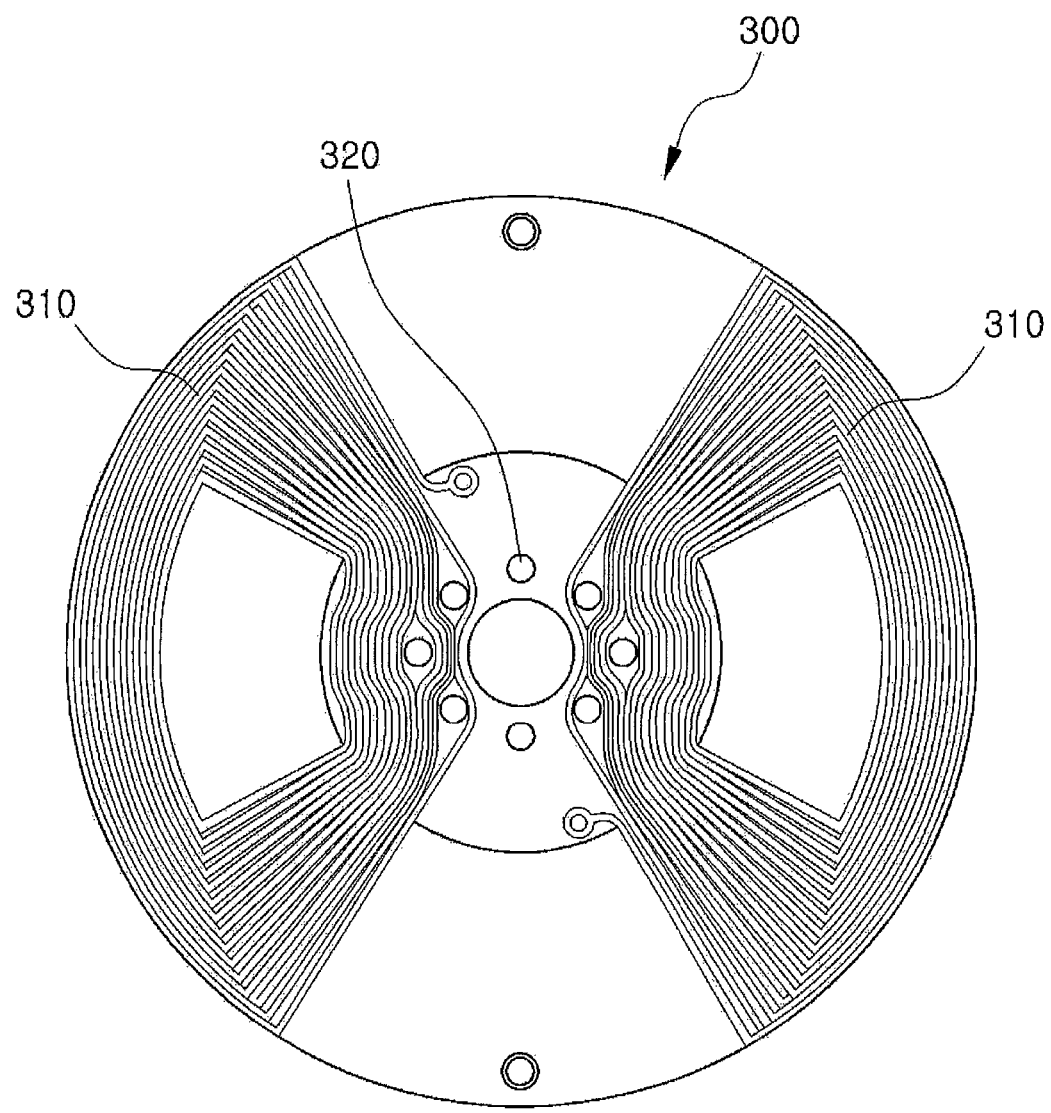
FIG. 4 is a rear view of a PCB-typed moving coil for angular vibration of Embodiment 1.

FIG. 3 is a cross-sectional view of Embodiment 1, and FIG. 4 is a rear view of the multi-layered PCB-typed moving coil of Embodiment 1.

Referring to FIG. 3, Embodiment 1, has an rotational body 100 forming an appearance of Embodiment 1. The body 100 includes a lower body 110, a lower yoke plate 120, a cylindrical yoke 130, an upper yoke plate 140, a bearing housing 150, and an upper body 160.

Referring to FIG. 3, a top portion of the lower body 110 is rigidly mounted to the lower yoke plate 120, a top portion of the lower yoke plate 120 is rigidly mounted to the cylindrical yoke 130, a top portion of the cylindrical yoke 130 is rigidly mounted to the upper yoke plate 140, a top portion of the upper yoke plate 140 is rigidly mounted to the bearing housing 150, and a top portion of the bearing housing 150 is mounted to the upper body 160.

Referring to FIG. 3, an inside of the body 100 is mounted with a rotational shaft 200. The rotational shaft 200 is mounted so that a top end thereof is exposed above the body 160 and a bottom end thereof is disposed in the cylindrical yoke 130. The bearing housing 150 is mounted with an upper bearing 151 and a lower bearing 152 so as to support left and right rotation of the rotational shaft 200. Meanwhile, the top end of the rotational shaft 200 may be mounted with a mounting groove (no reference numeral) so that the top end thereof is mounted with a angular vibration sensor for correcting sensitivity described in Background Art. The inside of the mounting groove (no reference numeral) may be mounted with a female screw.

Referring to FIG. 3, an inside of the cylindrical yoke 130 is fixedly mounted with an upper permanent magnet 131 and a lower permanent magnet 132, while being vertically spaced apart from each other. The upper permanent magnet 131 may be rigidly fixed to a bottom surface of the upper yoke plate 140 and the lower permanent magnet 132 may be rigidly fixed to a top surface of the lower yoke plate 120. In the case of the upper permanent magnet 131, a plurality of permanent magnets being adjacent to one another but having opposite polarity are mounted to be spaced apart from one another along a circumference.

Similarly to the upper permanent magnet 131, in the case of the lower permanent magnet 132, a plurality of permanent magnets being adjacent to one another but having opposite polarity are mounted so as to be spaced apart from one another along a circumference, wherein the bottom portions of each of the upper permanent magnets 132 may be mounted with the permanent magnet having opposite polarity to each of the upper permanent magnets 132.

Referring to FIG. 3, the multi-layered moving coil 300 is positioned between the upper permanent magnet 131 and the lower permanent magnet 132. The moving coil 300 is a moving coil manufactured according to "method for manufacturing a moving coil for an angular exciter using a method for manufacturing a multi-layer PCB (Registration No. KR10-0780915)" described in Background Art.

Referring to FIG. 4, the PCB-typed moving coil 300 for angular vibration is mounted with coil patterns 310 for angular vibration. The plurality of PCB-typed moving coils 300 for angular vibration may be vertically stacked, wherein the coil patterns 310 for angular vibration may be formed bisymmetrically at the same position. The coil patterns 310 for angular vibration mounted in each of the PCB-typed moving coil for angular vibration are stacked to be conducted to each other.

Referring to FIG. 4, the PCB-typed moving coil 300 for angular vibration is mounted with a PCB-typed moving coil fastening hole 320 for angular vibration.

Figure 8:
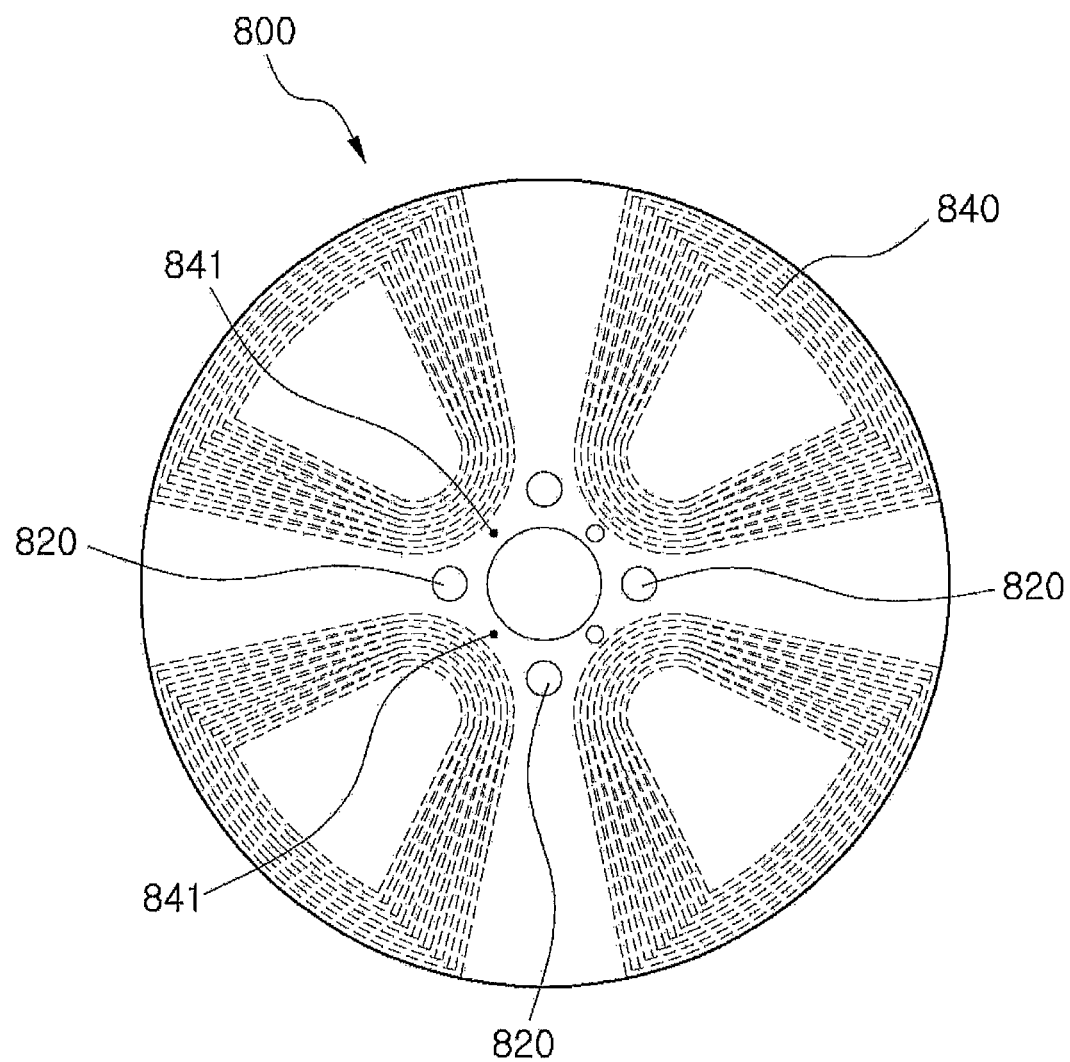
FIG. 8 is a rear view of a PCB-typed moving coil for measuring induction voltage of Embodiment 2.

Referring to FIG. 3, the upper PCB 400 is mounted under the PCB-typed moving coil 300 for angular vibration. Referring to FIG. 8, the upper PCB 400 is mounted with the wire pattern 410 for upper PCB angular vibration electrically connected with the coil pattern 310 for angular vibration. The upper PCB 400 is mounted with an upper PCB fastening hole 420 at a position corresponding to the PCB-typed moving coil fastening hole 320 for angular vibration.

Figure 9:
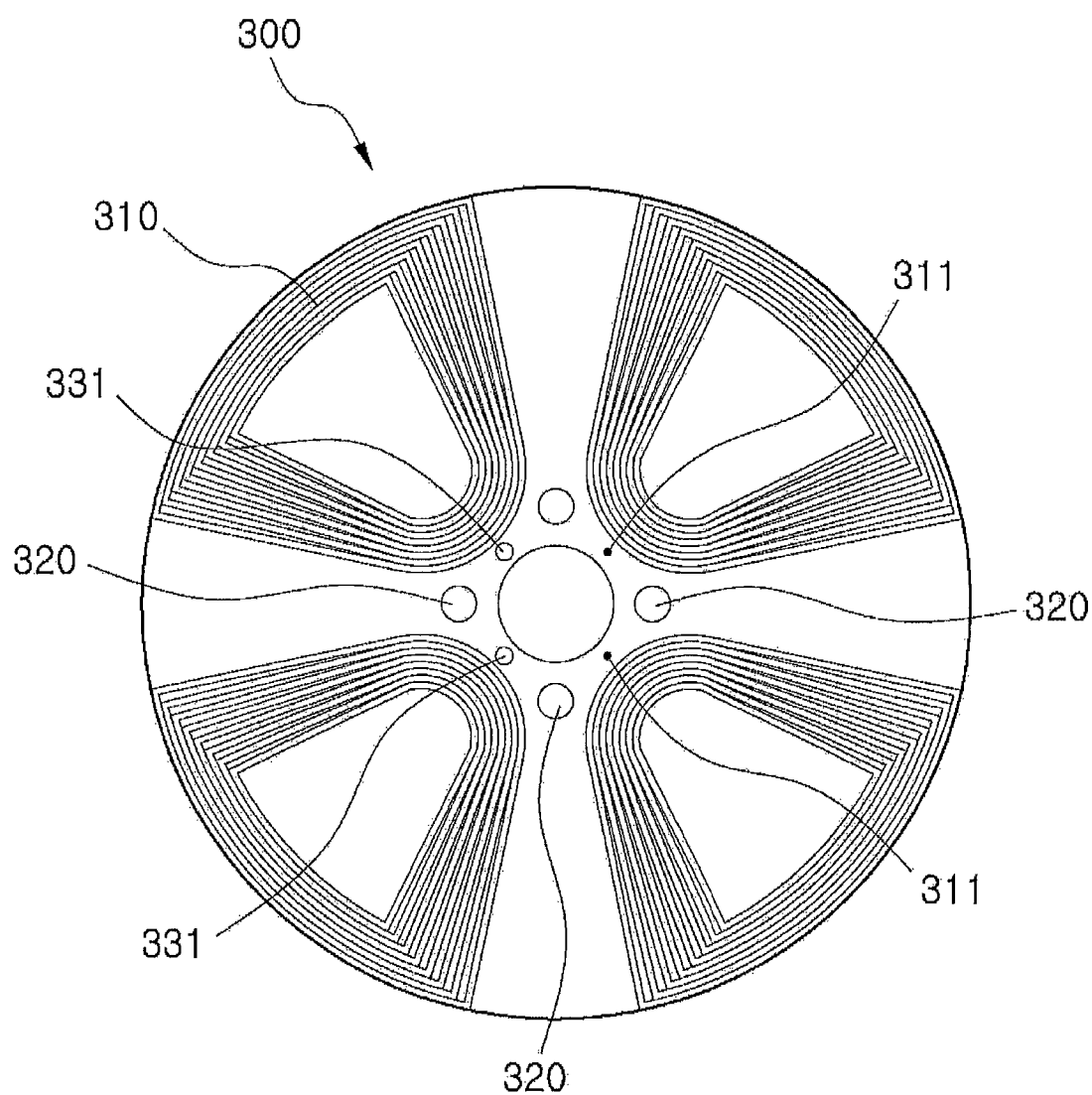
FIG. 9 is a rear view of a PCB-typed moving coil for angular vibration of Embodiment 2.

Referring to FIG. 3, the bottom surface of the body 100, that is, the bottom surface in the lower body 110 is fixedly mounted with the lower PCB 500. Referring to FIG. 9, the lower PCB 500 is mounted with a wire pattern 510 for a lower PCB current supply source. Referring to FIG. 3, the wire pattern 510 for a lower PCB current supply source is electrically connected with an external current supply source through an external current supply connector 600.

Figure 6:
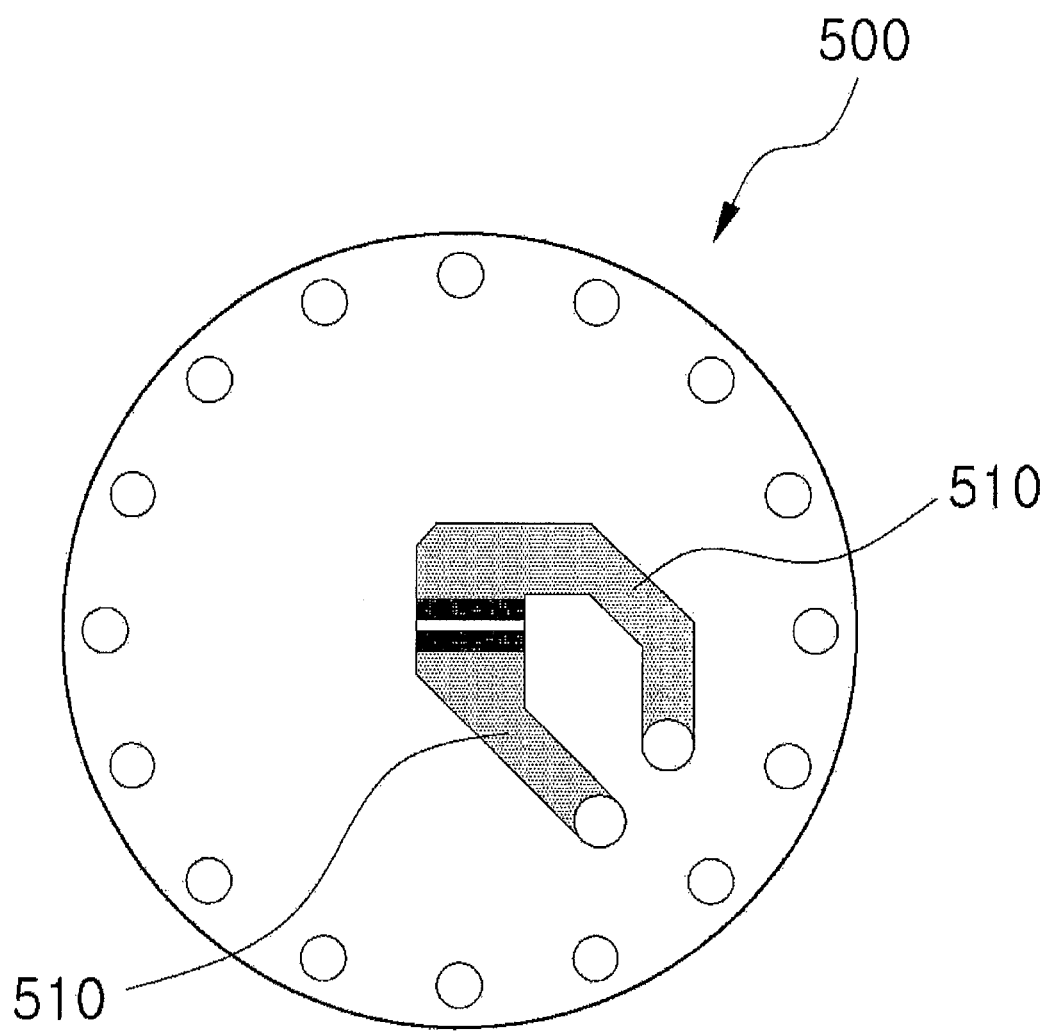
FIG. 6 is a plan view of a lower PCB of Embodiment 1.
Figure 7:
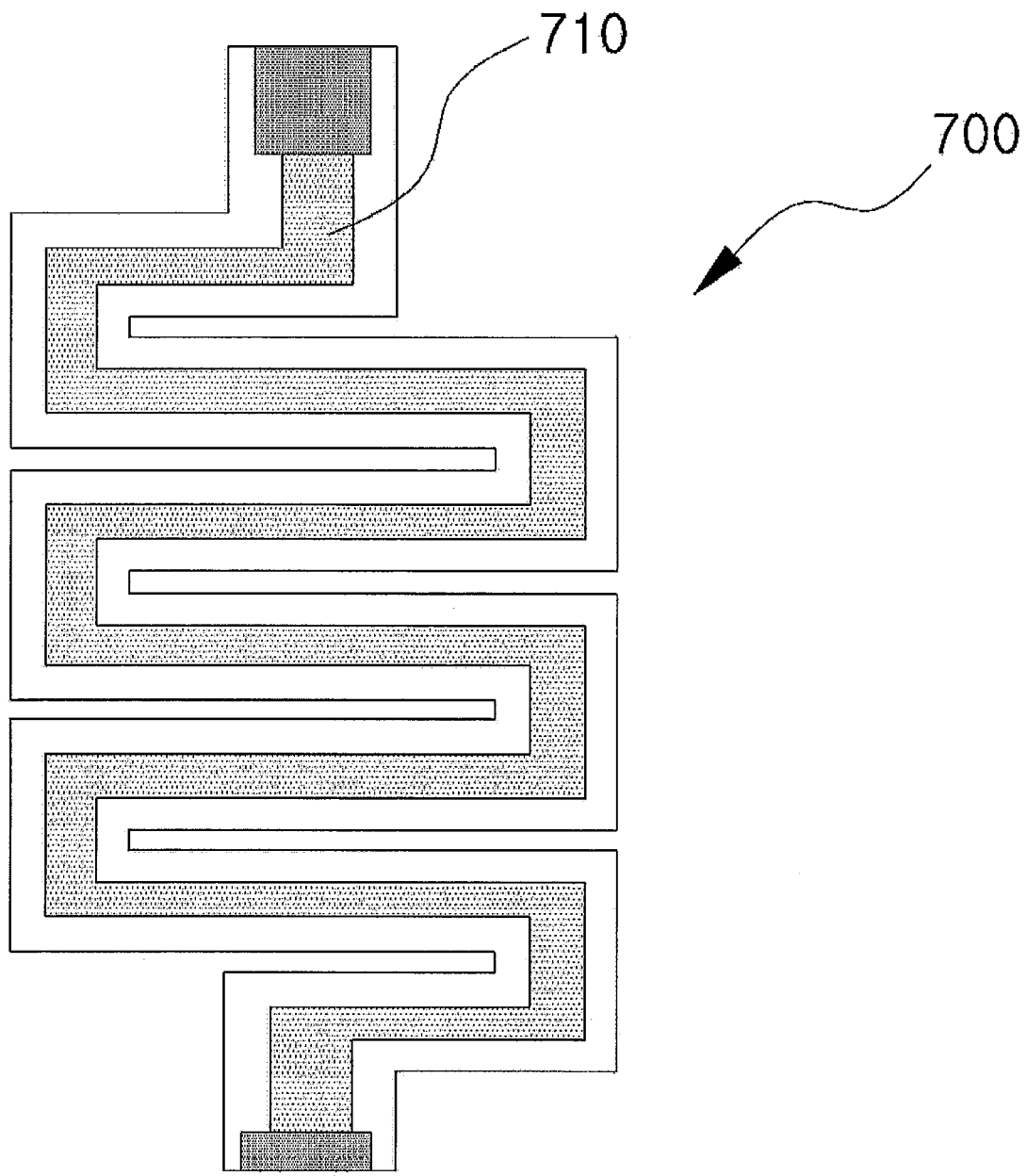
FIG. 7 is a front view of a vertical flexible PCB of Embodiment 1.

Referring to FIG. 3, the upper PCB 400 and the lower PCB 500 are connected with each other by a vertical flexible PCB 700. Referring to FIG. 7, the vertical flexible PCB 700 is mounted with a wire pattern 710 for a vertical flexible PCB angular vibration of which the top end is electrically connected with the wire pattern 410 for upper PCB angular vibration and the bottom end is electrically connected with the wire pattern 510 for a lower PCB current supply source. The wire pattern 710 for a vertical flexible PCB angular vibration is separately mounted on front and rear surfaces of the vertical flexible PCB 700. That is, the single wire pattern 710 for a vertical flexible PCB angular vibration is connected with one terminal of the external current supply source through the single wire pattern 510 for a lower PCB current supply source and the other wire pattern 710 for a vertical flexible PCB angular vibration is connected with the other terminal of the external current supply source through the other wire pattern 510 for a lower PCB current supply source. That is, referring to FIGS. 3, 5, and 7, the top end of the vertical flexible PCB 700 is inserted into the upper PCB 400 so as to be electrically connected with the wire pattern 410 for upper PCB angular vibration and referring to FIGS. 3, 6, and 7, the bottom end of the vertical flexible PCB 700 is inserted into the lower PCB 500 so as to be electrically connected with the wire pattern 510 for a lower PCB current supply source. Meanwhile, the vertical flexible PCB 700 of which the top end is inserted into the upper PCB 400 may be welded and the bottom end is inserted into the lower PCB 500 may be welded.

Figure 5:
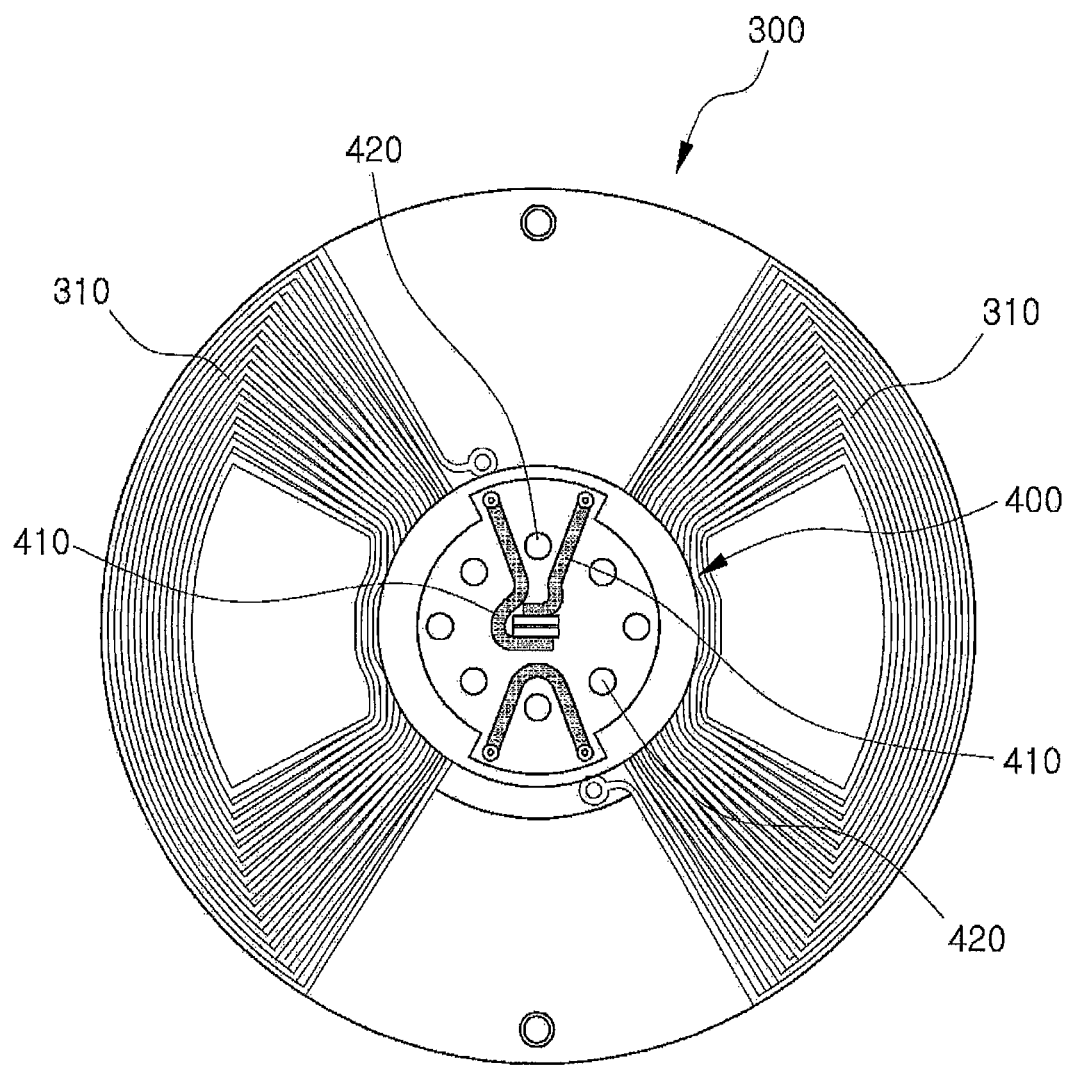
FIG. 5 is a rear view of an upper PCB of Embodiment 1.

Referring to FIGS. 3 and 5, the PCB-typed moving coil 300 for angular vibration and the upper PCB 400 are fixedly fastened to the bottom end of the rotational shaft 200 through a fastening bolt that is inserted through the PCB-typed moving coil fastening hole 320 (see FIG. 4) for angular vibration. Therefore, the rotational shaft 200 and the upper PCB 400 are rotatably vibrated with the PCB-typed moving coil 300 for angular vibration as the PCB-typed moving coil 300 for angular vibration is rotatably vibrated.

Referring to FIGS. 3 and 7, the vertical flexible PCB 700 may be formed in a meander shape having a left flexure and a right flexure. Therefore, the vertical flexible PCB 700 may be formed in a "Z"-letter shape in addition to "ㄹ"-letter shape shown in FIGS. 3 and 7. The vertical flexible PCB 700 is formed so that the top end thereof inserted into the upper PCB 400 is rotatably vibrated with the upper PCB in the fixing state in which the bottom end thereof is inserted into the lower PCB 500. In this case, the vertical flexible PCB 700 has a relatively lower density than that of the PCB-typed moving coil 300 for angular vibration and a portion connecting the left flexure with the right flexure buffers against twist applied to the vertical flexible PCB 700, such that the effect of The vertical flexible PCB 700 applied to the angular vibration of the PCB-typed moving coil 300 for angular vibration is insignificant and thus, may be disregarded.

Embodiment 2

Embodiment 2, relates to an rotational vibration exciter according to the present invention.

Figure 10:
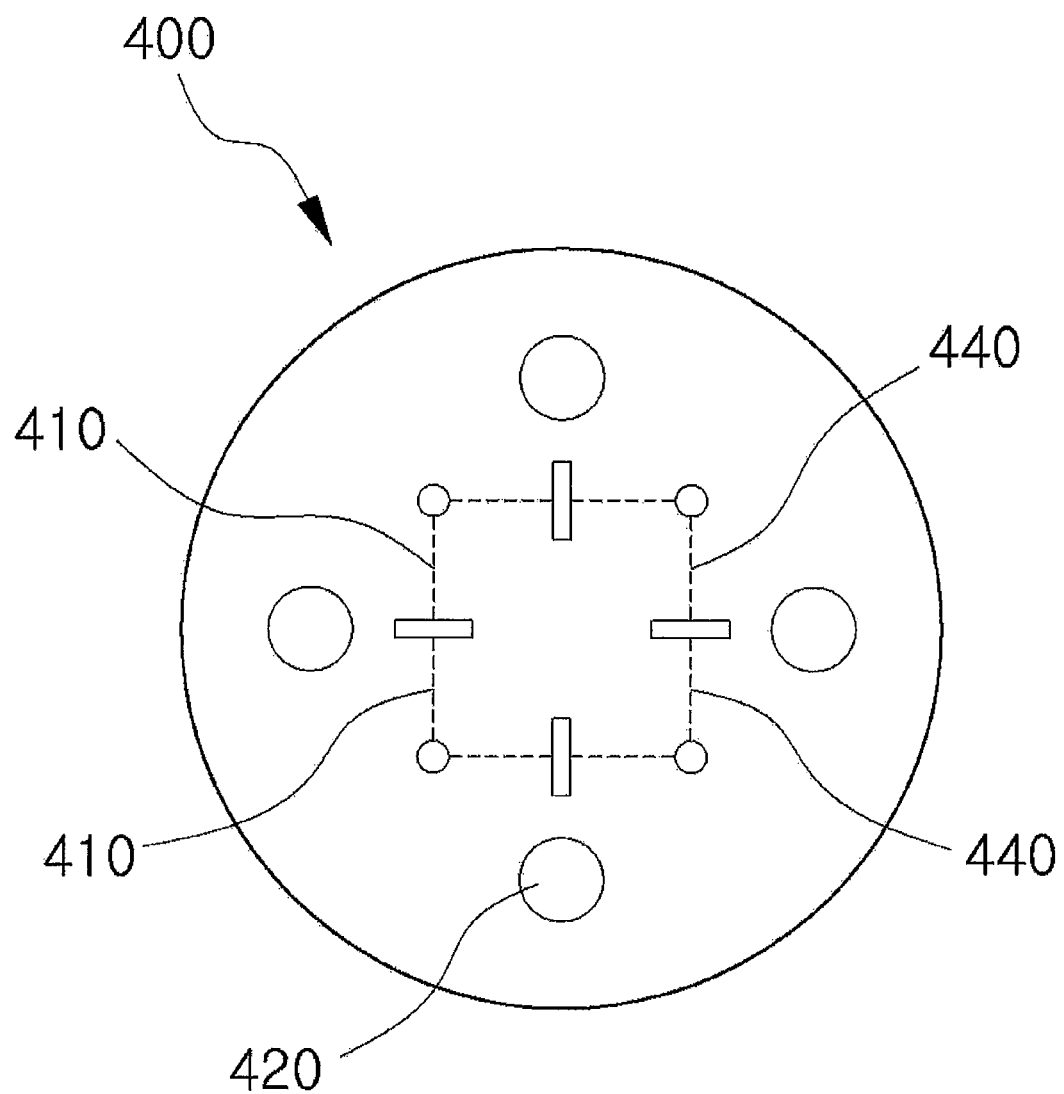
FIG. 10 is a rear view of an upper PCB of Embodiment 2.
Figure 11:
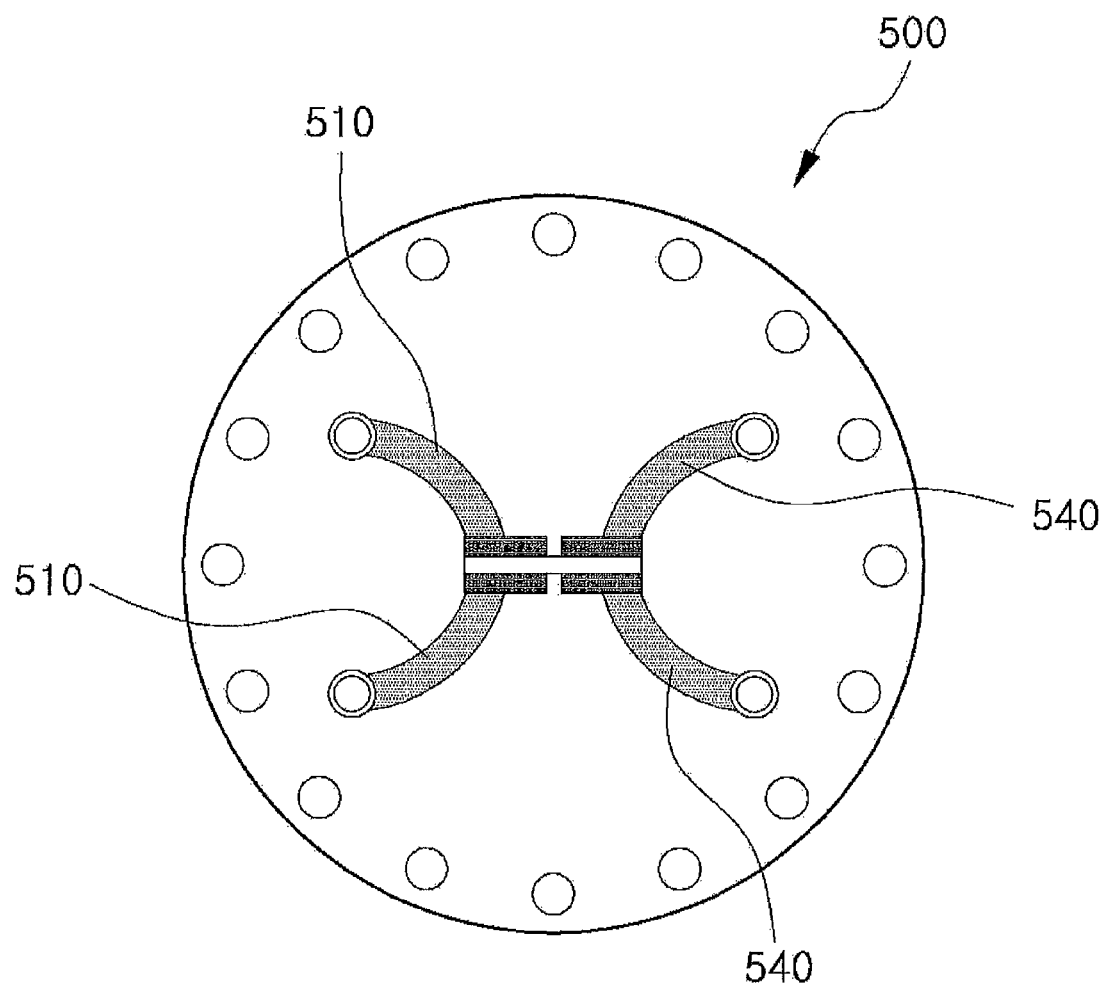
FIG. 11 is a plan view of a lower PCB of Embodiment 2.
Figure 12:
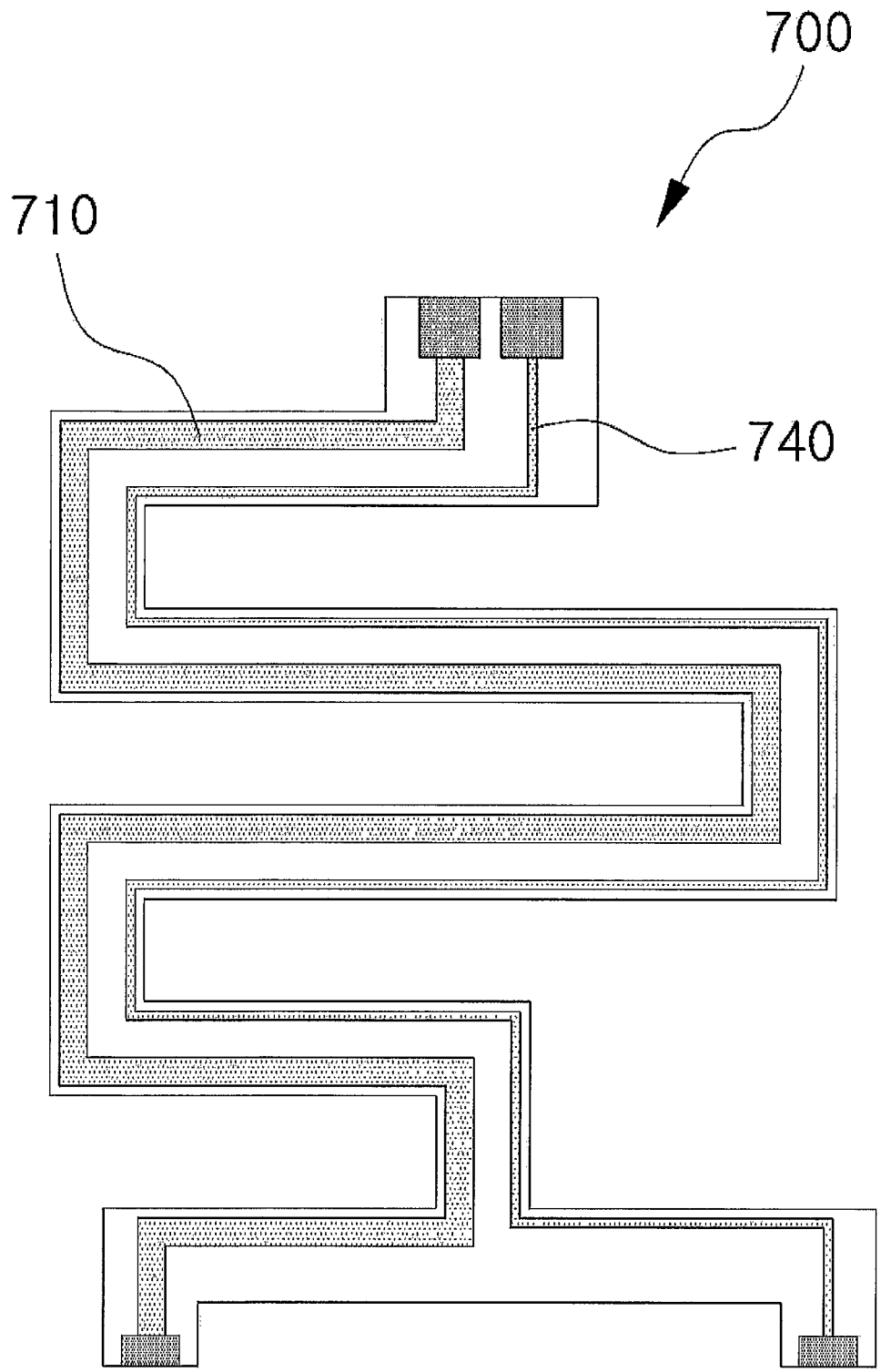
FIG. 12 is a front view of a vertical flexible PCB of Embodiment 2.

FIG. 8 is a rear view of a PCB-typed moving coil for measuring induction voltage of Embodiment 2,, FIG. 9 is a rear view of a PCB-typed moving coil for angular vibration of Embodiment 2, FIG. 10 is a rear view of an upper PCB of Embodiment 2, FIG. 11 is a front view of a vertical flexible PCB of Embodiment 2, and FIG. 12 is a plan view of a lower PCB of Embodiment 2.

Embodiment 2, includes a PCB-typed moving coil 800 for measuring induction voltage (see FIG. 8). The coil 800 is to measure the angular velocity of angular vibration. Embodiment 2, is the same as Embodiment 1, except that Embodiment 2, enables to measure the angular velocity of rotational vibration exciter and therefore, the same components are denoted by the same name and reference signs.

Although not shown in drawings, the PCB-typed moving coil 800 for measuring induction voltage is integrally rigidly fixed to the rotational shaft 200 (see FIG. 3) so as to integrally rotate with the rotational shaft 200 (see FIG. 3) and is disposed between the upper permanent magnet 131 (see FIG. 3) and the lower permanent magnet 132 (see FIG. 3). Therefore, the PCB-typed moving coil 800 for measuring induction voltage may be stacked on the top portion of the PCB-typed moving coil 300 for angular vibration.

Referring to FIG. 8, the PCB-typed moving coil 800 for measuring induction voltage is mounted with a coil pattern 840 for measuring induction voltage. The coil pattern 840 for measuring induction voltage is formed in the same pattern as the coil pattern 310 (see FIG. 9) for angular vibration. That is, the coil pattern 840 for measuring induction voltage is formed bisymmetrically at the same pattern as the coil pattern 310 (see FIG. 9) for angular vibration. The coil pattern 840 for measuring induction voltage is formed on the top surface of the PCB-typed moving coil 800 for measuring induction voltage and therefore, may be vertically stacked so as to be conducted to each other even in the case in which the coil pattern 310 (see FIG. 9) for angular vibration is formed on both surfaces of the PCB-typed moving coil 300 for angular vibration (see FIG. 9).

Referring to FIG. 8, the bottom surface of the PCB-typed moving coil 800 for measuring induction voltage is protrudedly mounted with a PCB-typed moving coil connection line 841 for measuring induction voltage electrically connected with the coil pattern 840 for measuring induction voltage. In addition, the PCB-typed moving coil 800 for measuring induction voltage is mounted with the PCB-typed moving coil fastening hole 820 for measuring induction voltage.

FIG. 9 shows that the surfaces of each of the PCB-typed moving coils 300 for angular vibration are mounted with two pairs of the coil patterns 310 for angular vibration, unlike Embodiment 1. In this case, the number and arrangement angle of permanent magnets 131 and 132 are different from Embodiment 1, which is apparent to those skilled in the art. As a result, the detailed description thereof will be omitted.

Referring to FIG. 9, the bottom side of the coil 300 for angular vibration generation is made to have the coil PCB connection line 311 electrically connected to the coil pattern 310.

Referring to FIG. 9, the PCB-typed moving coil 300 for angular vibration is mounted with the PCB-typed moving coil fastening hole 320 for angular vibration. The PCB-typed moving coil fastening hole 320 for angular vibration is mounted at a position corresponding to the PCB-typed moving coil fastening hole 820 for measuring induction voltage.

Referring to FIG. 9, the PCB-typed moving coil 300 for angular vibration is protrudedly mounted with the PCB-typed moving coil guide hole 331 for angular vibration. The PCB-typed moving coil guide hole 331 for angular vibration is to protrude the PCB-typed moving coil connection line 841 (see FIG. 8) for measuring induction voltage inserted thereinto to the bottom portion of the PCB-typed moving coil 300 for angular vibration.

Referring to FIG. 10, the upper PCB 400 is further mounted with the wire pattern 440 for measuring the upper PCB induction voltage in addition to the wire pattern 410 for measuring the upper PCB angular vibration. The wire pattern 440 for measuring the upper PCB induction voltage is electrically connected with the coil pattern 840 for measuring induction voltage through the electrical connection with the PCB-typed moving coil connection line 841 for measuring induction voltage.

Referring to FIG. 10, the upper PCB 400 is mounted with the upper PCB fastening hole 420 at a position corresponding to the PCB-typed moving coil fastening hole 320 for angular vibration.

Although not shown in drawings, the PCB-typed moving coil 800 for measuring induction voltage, the PCB-typed moving coil 300 for angular vibration, and the upper PCB 400 are fixedly fastened sequentially to the bottom end of the rotational shaft 200 (see FIG. 3). In this case, the PCB-typed moving coil 800 for measuring induction voltage, the PCB-typed moving coil 300 for angular vibration, and the upper PCB 400 is fixedly fastened to the rotational shaft 200 (see FIG. 3) through a fastening bolt that is inserted through the PCB-typed moving coil fastening hole 820 for measuring induction voltage, the PCB-typed moving coil fastening hole 320 for angular vibration, and the upper PCB fastening hole 420.

Referring to FIG. 11, the lower PCB 500 is further mounted with the wire pattern 540 for measuring the lower PCB induction voltage in addition to the wire pattern 510 for the lower PCB current supply source. The wire pattern 540 for measuring the lower PCB induction voltage formed on the lower PCB 500 is electrically connected with the external voltage measuring apparatus disposed at the outside through an external voltage measurement connector.

Referring to FIG. 12, the vertical flexible PCB 700 is further mounted with the wire pattern 740 for measuring the wire pattern 740 for measuring the vertical flexible PCB induction voltage in addition to the wire pattern 710 for a vertical flexible PCB angular vibration. The top end of the wire pattern 740 for measuring a vertical flexible PCB induction voltage formed on the vertical flexible PCB 700 is electrically connected with the wire pattern 410 for measuring upper PCB induction voltage and the bottom end thereof is electrically connected with the wire pattern 540 for measuring lower PCB induction voltage.

As the PCB-typed moving coil 300 for angular vibration is rotatably vibrated, the PCB-typed moving coil 800 for measuring induction voltage is rotatably vibrated in the same direction. That is, the PCB-typed moving coil 800 for measuring induction voltage moves in a direction orthogonal to a magnetic field direction formed between the upper permanent magnet 131 and the lower permanent magnet 132, which generates the induction voltage to the coil pattern 840 for measuring induction voltage according to a Faraday' law. The induction voltage generated to the coil pattern 840 for measuring induction voltage is represented by the following Equation.

$$V_i = (N_t \times B \times L \times R_c) \times \omega$$

In the above equation, $N_t$, represents a total number of coil turns under the magnetic field, B represents the strength of magnetic field in a vertical direction, L represents an effective length of a moving coil that is a difference between an inward radius and an outward radius of the permanent magnets 131 and 132, $R_c$, represents an average value of an inward radius and an outward radius of the permanent magnets 131 and 132, and $\omega$ represents the angular velocity of the coil pattern 840. Therefore, it is shown that the measured induction voltage may be a voltage signal proportional to the angular velocity.

When AC current is applied to the coil pattern 310 for angular vibration, the PCB-typed moving coil 300 for rotational vibration generates torque and thus, the rotational shaft 200 moves at angular acceleration in proportion to the torque. In this case, the angular velocity ω of the coil pattern 840 for measuring induction voltage may be measured by measuring voltage in proportion to the angular velocity of the rotational shaft 200 from the coil pattern 840 for measuring induction voltage.

The invention claimed is:

1. An rotational vibration exciter, comprising:
a body;
a rotational shaft having a top end exposed upwardly and mounted to rotate left and right in the body;
an upper permanent magnet and a lower permanent magnet surrounding a bottom end of the rotational shaft fixedly mounted in the body while being vertically spaced from each other;
a coil printed circuit board (PCB) for angular vibration formed with a coil pattern for angular vibration and disposed between the upper permanent magnet and the lower permanent magnet while being rigidly fixed to the rotational shaft so as to integrally rotate with the rotational shaft;
an upper PCB mounted under the PCB-typed moving coil for angular vibration so as to integrally rotate with the rotational shaft and formed with a wire pattern for upper PCB angular vibration electrically connected with the coil pattern for angular vibration;
a lower PCB fixed to a bottom surface in the body and formed with a wire pattern for a lower PCB current supply source electrically connected with an external current supply source; and
a vertical flexible PCB having a top end electrically connected with the wire pattern for upper PCB angular vibration and a bottom end electrically connected with the wire pattern for the lower PCB current supply source.

2. The rotational vibration exciter of claim 1, wherein the vertical flexible PCB has a meander shape including a left flexure and a right flexure.

3. The rotational vibration exciter of claim 2, wherein the PCB-typed moving coil for angular vibration is mounted with a PCB-typed moving coil fastening hole for the angular vibration coil,
the upper PCB is mounted with an upper PCB fastening hole at a position corresponding to the PCB-typed moving coil fastening hole for angular vibration, and
the PCB-typed moving coil for angular vibration and the upper PCB are fixedly fastened to the bottom end of the rotational shaft by a fastening bolt that is inserted through the PCB-typed moving coil fastening hole for angular vibration coil and the upper PCB fastening hole.

4. The rotational vibration exciter of claim 2, further comprising a PCB-typed moving coil for measuring induction voltage formed with a coil pattern for measuring induction voltage and disposed between the upper permanent magnet and the lower permanent magnet while being rigidly fixed to the rotational shaft so as to integrally rotate with the rotational shaft.

5. The rotational vibration exciter of claim 4, wherein a bottom surface of the PCB-typed moving coil for measuring induction voltage is protrudedly mounted with a PCB-typed moving coil connection line for measuring induction voltage electrically connected the coil pattern for measuring induction voltage, the PCB-typed moving coil for measuring induction voltage is mounted with a PCB-typed moving coil fastening hole for measuring induction voltage, a bottom surface of the PCB-typed moving coil for angular vibration is protrudedly mounted with a PCB-typed moving coil connection line for angular vibration electrically connected with the coil pattern for angular vibration, the PCB-typed moving coil for angular vibration is mounted with the PCB-typed moving coil fastening hole for angular vibration at a position corresponding to the PCB-typed moving coil fastening hole for measuring induction voltage, the PCB-typed moving coil for angular vibration is protrudedly mounted with a PCB-typed moving coil guide hole for angular vibration protruded downwardly, having the PCB-typed moving coil connection line for measuring induction voltage inserted thereinto, the upper PCB is further mounted with a wire pattern for measuring upper PCB induction voltage electrically connected with the coil pattern for measuring induction voltage through electrical connection with the PCB-typed moving coil connection line for measuring induction voltage, the upper PCB is mounted with the upper PCB fastening hole at a position corresponding to the PCB-typed moving coil fastening hole for angular vibration, the PCB-typed moving coil for measuring induction voltage, the PCB-typed moving coil for angular vibration, and the upper PCB are fixedly fixed to the bottom end of the rotational shaft through a fastening bolt that is inserted through the PCB-typed moving coil fastening hole for measuring induction voltage, the PCB-typed moving coil fastening hole for angular vibration, and the upper PCB fastening hole, the lower PCB is further mounted with a wire pattern for measuring lower PCB induction voltage electrically connected with an external voltage measuring device, and the vertical flexible PCB is further mounted with a wire pattern for measuring a vertical flexible PCB induction voltage of which the top end is electrically connected with the wire pattern for measuring upper PCB induction voltage and the bottom end is electrically connected with the wire pattern for measuring lower PCB induction voltage.

6. The rotational vibration exciter of claim 1, wherein the PCB-typed moving coil for angular vibration is mounted with a PCB-typed moving coil fastening hole for the angular vibration coil, the upper PCB is mounted with an upper PCB fastening hole at a position corresponding to the PCB-typed moving coil fastening hole for angular vibration, and the PCB-typed moving coil for angular vibration and the upper PCB are fixedly fastened to the bottom end of the rotational shaft by a fastening bolt that is inserted through the PCB-typed moving coil fastening hole for angular vibration coil and the upper PCB fastening hole.

7. The rotational vibration exciter of claim 1, further comprising a PCB-typed moving coil for measuring induction voltage formed with a coil pattern for measuring induction voltage and disposed between the upper permanent magnet and the lower permanent magnet while being rigidly fixed to the rotational shaft so as to integrally rotate with the rotational shaft.

8. The rotational vibration exciter of claim 7, wherein a bottom surface of the PCB-typed moving coil for measuring induction voltage is protrudedly mounted with a PCB-typed moving coil connection line for measuring induction voltage electrically connected the coil pattern for measuring induction voltage, the PCB-typed moving coil for measuring induction voltage is mounted with a PCB-typed moving coil fastening hole for measuring induction voltage, a bottom surface of the PCB-typed moving coil for angular vibration is protrudedly mounted with a PCB-typed moving coil connection line for angular vibration electrically connected with the coil pattern for angular vibration, the PCB-typed moving coil for angular vibration is mounted with the PCB-typed moving coil fastening hole for angular vibration at a position corresponding to the PCB-typed moving coil fastening hole for measuring induction voltage, the PCB-typed moving coil for angular vibration is protrudedly mounted with a PCB-typed moving coil guide hole for angular vibration protruded downwardly, having the PCB-typed moving coil connection line for measuring induction voltage inserted thereinto, the upper PCB is further mounted with a wire pattern for measuring upper PCB induction voltage electrically connected with the coil pattern for measuring induction voltage through electrical connection with the PCB-typed moving coil connection line for measuring induction voltage, the upper PCB is mounted with the upper PCB fastening hole at a position corresponding to the PCB-typed moving coil fastening hole for angular vibration, the PCB-typed moving coil for measuring induction voltage, the PCB-typed moving coil for angular vibration, and the upper PCB are fixedly fixed to the bottom end of the rotational shaft through a fastening bolt that is inserted through the PCB-typed moving coil fastening hole for measuring induction voltage, the PCB-typed moving coil fastening hole for angular vibration, and the upper PCB fastening hole, the lower PCB is further mounted with a wire pattern for measuring lower PCB induction voltage electrically connected with an external voltage measuring device, and the vertical flexible PCB is further mounted with a wire pattern for measuring a vertical flexible PCB induction voltage of which the top end is electrically connected with the wire pattern for measuring upper PCB induction voltage and the bottom end is electrically connected with the wire pattern for measuring lower PCB induction voltage.

* * * * *

UNITED STATES PATENT AND TRADEMARK OFFICE
CERTIFICATE OF CORRECTION

Page 1 of 1

PATENT NO.         : 8,860,268 B2
APPLICATION NO.    : 13/393464
DATED              : October 14, 2014
INVENTOR(S)        : Wan Sup Chung et al.

It is certified that error appears in the above-identified patent and that said Letters Patent is hereby corrected as shown below:

IN THE CLAIMS:

Column 10, Line 66, Claim 5, delete "connected" and insert -- connected with --

Column 12, Line 10, Claim 8, delete "connected" and insert -- connected with --

Signed and Sealed this
Seventeenth Day of February, 2015

Michelle K. Lee
*Deputy Director of the United States Patent and Trademark Office*